United States Patent [19]

Suzuki

[11] Patent Number: 4,946,409
[45] Date of Patent: Aug. 7, 1990

[54] LUBRICATING DEVICE FOR POWER DEVICE OF INBOARD/OUTBOARD UNIT

[75] Inventor: Takayoshi Suzuki, Hamamatsu, Japan

[73] Assignee: Sanshin Kogyo Kabushiki Kaisha, Hamamatsu, Japan

[21] Appl. No.: 332,707

[22] Filed: Apr. 3, 1989

[30] Foreign Application Priority Data

Apr. 4, 1988 [JP] Japan .............................. 63-081349

[51] Int. Cl.⁵ ............................................ B63H 23/34
[52] U.S. Cl. ......................................... 440/75; 440/88
[58] Field of Search ............................. 440/75, 83, 88

[56] References Cited

U.S. PATENT DOCUMENTS

| 3,217,688 | 11/1965 | Warburton | 440/75 |
| 3,376,842 | 4/1968 | Wynne | 440/88 |
| 3,428,018 | 2/1969 | Ellzey | 440/88 |
| 3,799,291 | 3/1974 | Becker | 440/88 |
| 4,650,430 | 3/1987 | Schiek | 440/83 |

FOREIGN PATENT DOCUMENTS 205597 9/1986 Japan .................................. 440/88

Primary Examiner—Sherman D. Basinger
Assistant Examiner—Stephen P. Avila
Attorney, Agent, or Firm—Ernest A. Beutler

[57] ABSTRACT

A marine outboard drive that accommodates counter-rotation and which further includes a lubricant pump driven from the input shaft for circulating lubricant through the outboard drive. The lubricant pump is driven directly from the input shaft so that it will rotate in the same direction regardless of the direction of rotation of the drive shaft. The lubricant pump delivers lubricant to all components of the outboard drive that require lubrication.

15 Claims, 3 Drawing Sheets

LUBRICATING DEVICE FOR POWER DEVICE OF INBOARD/OUTBOARD UNIT

BACKGROUND OF THE INVENTION

This invention relates to a lubricating device for the power device of an inboard/outboard unit and more particularly to an improved lubricating system for a marine outboard drive.

In one well known type of marine outboard drive, there is Provided an outer casing that is adapted to be mounted on the transom of a watercraft and which includes an input shaft that is driven by the engine, a drive shaft that rotates about a generally vertically extending axis and which is driven by the input shaft from a first transmission. The lower end of the drive shaft is drivably coupled to a propulsion device such as a propeller through a second transmission. Normally, the outer casing defines a lubricant sump which surrounds the second transmission and which lubricates certain components of the outboard drive.

Although this type of arrangement is particularly advantageous, the tendency is for the lubricating oil to become quite hot because of its combined function of lubricating and cooling the components. Particularly, where the lubricant is above the water level, it can reach high temperatures such as 100° C. and this can cause certain problems such as corrosion of rubber seals, paint coatings and deterioration of the oil.

It is, therefore, a first object of this invention to provide an improved lubricating device for a marine outboard drive wherein the lubricant will be circulated within the outboard drive for combining the lubricating functions and also for cooling the lubricant.

It is a further object of this invention to provide an improved pressure lubricating system for a marine outboard drive wherein the lubricating pump is driven from the input shaft and draws lubricant from the lubricant sump, delivers it to the various components to be lubricated and returns it to the sump.

In conjunction with marine outboard drives of this type, it has recently been proposed to construct the arrangement in such a manner that the simple reversal of a bevel driving gear on the input shaft from one side to the other of a driven bevel gear at the upper end of the drive shaft is effective to achieve counterrotation. A highly useful construction in which this type of reversal can be achieved is shown in the copending application of Hayasaka Kenichi, entitled "Propulsion Unit For Inboard-Outboard Motor", Ser. No. 252,683, filed Oct. 3, 1988, and assigned to the assignee of this invention. However, when a lubricating system having a driven pump is employed with such a reversal mechanism, it is desirable, in order to maintain the advantages of simplicity of that type of system, to insure that the driving pump will be driven in the same direction regardless of the direction in which the drive shaft is driven.

It is, therefore, a still further object of this invention to provide an improved arrangement for driving the lubricating pump of an inboard/outboard unit.

It is a further object of this invention to provide an improved lubricant pump driving arrangement for an inboard/outboard engine wherein the reversal of the drive shaft may be easily obtained and wherein the lubricant pump is always driven in the same direction regardless of the direction of rotation of the drive shaft.

SUMMARY OF THE INVENTION

This invention is adapted to be embodied in a marine outboard drive that is comprised of an outer casing that is adapted to be mounted on the transom of a watercraft and which is comprised of an input shaft journaled in the outer casing for rotation about a generally horizontally extending axis. A drive shaft is journaled for rotation about a generally vertically extending axis in the outer casing and is driven from the drive shaft by first transmission means. A propulsion device is carried by the outer casing at the lower end thereof and second transmission means drives the propulsion means from the lower end of the drive shaft. In accordance with the invention, a lubricant sump is formed in the outer casing surrounding at least in part the second transmission means. A lubricant pump is positioned at the upper end of the outer casing and is driven with the input shaft. Lubricant passage means communicate the input side of the lubricant pump with the lubricant sump and the output side of the lubricant pump with the lubricant sump for circulating lubricant through the outer casing.

DETAILED DESCRIPTION OF THE PREFERRED EMBODIMENT

Figure 1:
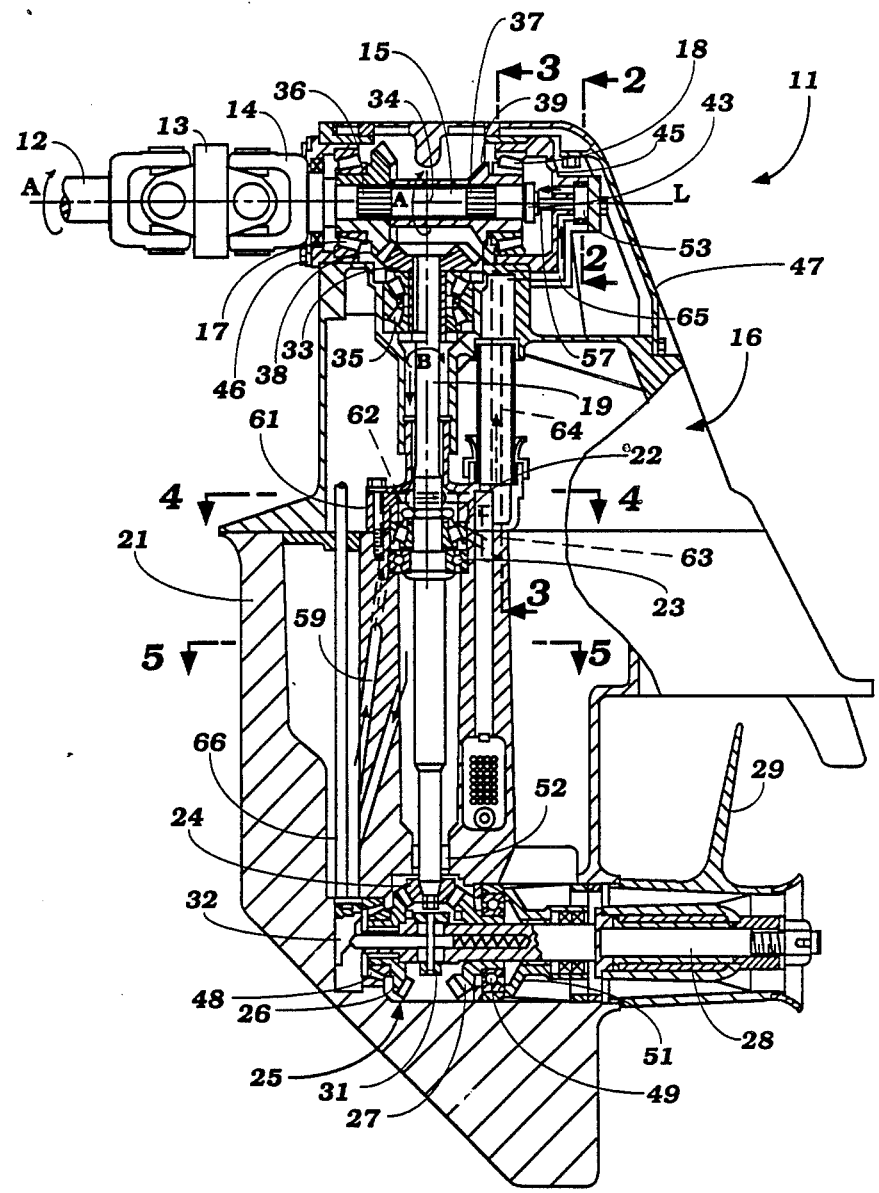
FIG. 1 is a side elevational view of a marine outboard drive constructed in accordance with an embodiment of the invention, with a portion broken away and shown in section.

Referring first primarily to FIG. 1, a marine outboard drive constructed in accordance with an embodiment of the invention is identified generally by the reference numeral 11. In the illustrated embodiment, the outboard drive 11 is comprised of the outboard drive unit of an inboard-outboard drive. It is to be understood, however, that certain facets of the invention may be applied equally as well with outboard motors. The invention, however, has particular utility in connection with arrangements wherein it is desirable to have the outboard drive and specifically its propulsion unit rotate in either normal or counterrotation modes.

The outboard drive 11 is powered by a remotely positioned internal combustion engine (not shown) which drives an input shaft 12 that rotates in a constant direction, indicated generally by the arrow A and which is, in the illustrated construction, clockwise. The drive shaft 12 is coupled by means of a universal joint 13 to an input shaft 14 of the outboard drive 11. The input shaft 14 has an extending portion 15 that is journaled within an outer housing 16 of the outboard drive 11 by means of a pair of spaced apart thrust bearings 17 and 18, in a manner to be described. The outer housing 16 is mounted on the transom of the associated watercraft (not shown) for steering movement about a vertical steering axis and for tilt and trim movement about a horizontal axis in any known manner.

A vertically extending drive shaft 19 is supported in the housing 16 by means of bearings to be described and depends into a lower unit 21. The drive shaft 19 is driven from the input shaft 15, in a manner to be described, so as to rotate either in a forward direction indicated by the arrow B in FIG. 1 or a reverse or counterdirection.

The drive shaft 19 is journaled by means of a first thrust bearing 22 that is positioned between the drive shaft housing 16 and a lower unit housing 21 and an anti-friction bearing 23 which is journaled adjacent it. The thrust bearing 22 is designed to take vertically upward thrusts transmitted to the drive shaft 19.

At its lower end, a bevel gear 24 is affixed for rotation with the drive shaft 19 in a known manner. The bevel gear 24 forms a portion of a forward, neutral, reverse transmission, indicated generally by the reference numeral 25. The forward, neutral, reverse transmission 25 includes a pair of counterrotating bevel gears comprised of a forward drive gear 26 and a reverse drive gear 27 that are in mesh with the driving bevel gear 24 on diametrically opposite sides of it. The bevel gears 26 and 27 are journaled upon a propeller shaft 28 to which a propulsion device such as a propeller 29 is affixed in a known manner.

A dog clutching sleeve 31 has a splined connection with the propeller shaft 28 so as to rotate with it and also to be axially movable along it. A shifting cam 32 is provided for shifting the dog clutching sleeve 31 between a neutral position as shown in FIG. 1 and a forward position wherein the dog clutching sleeve 31 rotatably couples the forward bevel gear 26 with the propeller shaft 28. Alternatively, the shifting cam 32 may shift the dog clutching sleeve 31 rearwardly so as to engage with the reverse gear 27 so as to rotatably couple this gear with the propeller shaft 28 for driving the propeller 29 in a reverse direction. This mechanism is generally conventional and, for that reason, further description of it is not believed to be necessary to understand the construction and operation of the inventive features of this embodiment.

It will be noted that a bevel gear 33 is affixed to the upper end of the drive shaft 19. The bevel gear 33 has its pitch circle arranged so that it intersects a point 34 at which the input shaft 15 is intersected by the axis of rotation of the drive shaft 19. The upper end of the drive shaft 19 and specifically the driven bevel gear 33 is supported by means of a double taper bearing 35 so as to take driving thrusts on the bevel gear 33 in opposite directions. This is in contradistinction to conventional constructions wherein a single acting thrust bearing is normally employed in this area. However, the drive shaft 19 is adapted to be rotated in either the forward B or a reverse direction by the mechanism now to be described. As a result, the thrust bearing 35 is designed to take thrusts in either direction.

It will be noted that the input shaft portion 15 is provided with spaced splined sections 36 and 37 that are spaced equidistant from the point of intersection 34 of the input shaft 14 and the drive shaft 19. A driving bevel gear 38 is designed to be selectively engaged with either the splined section 36 for forward rotation in the direction of the arrow B or with the splined section 37 for counterrotation as described in copending Application Ser. No. 252,633. A spacer sleeve 39 cooperates with the bevel gear 38 so as to insure proper alignment in each condition. It should be noted that the spacer sleeve 39 is formed with a hub portion which is complementary in configuration to a hub portion of the bevel gear 38 so as to facilitate this reversing in the direction of rotation.

In the forward degree of rotation as shown in FIG. 1, the hub of the driving bevel gear 38 is journaled in the thrust bearing 17 and the hub of the spacer shaft 39 is journaled in the thrust bearing 18. The assemblage is held together by means of a lock nut 43 and lock washer that are received on a threaded portion of the input shaft 14. A bearing cap 45 serves to hold and locate the thrust bearing 18. At the opposite end, a bearing cap 46 holds and locates the thrust bearing 17. A removable cover plate 47 affords access to the nut 43 so as to facilitate reversal of the bevel gear 38 and spacer sleeve 39 on the input shaft section 16 for reversal of the direction of rotation.

The propeller shaft 28 is supported for rotation about a generally horizontally extending axis by means of a first, forwardly position thrust bearing 48 which is contained within the outer housing 21 of the lower unit and which engages the forward driving bevel gear 26. An anti-friction bearing 49 is supported within a bearing carrier 51 that is held in place in a known manner for supporting the rear end of the propeller shaft 28.

A bearing 52 engages the lower end of the drive shaft 19 adjacent the bevel gear 24 for further supporting the drive shaft 19 in this area.

Figure 2:
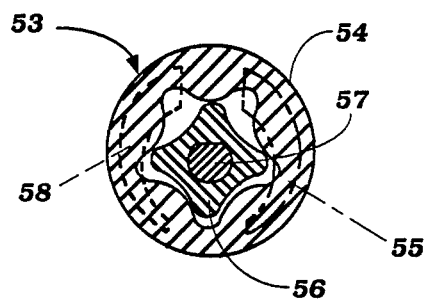
FIG. 2 is an enlarged cross-sectional view taken along the line 2—2 of FIG. 1.
Figure 3:
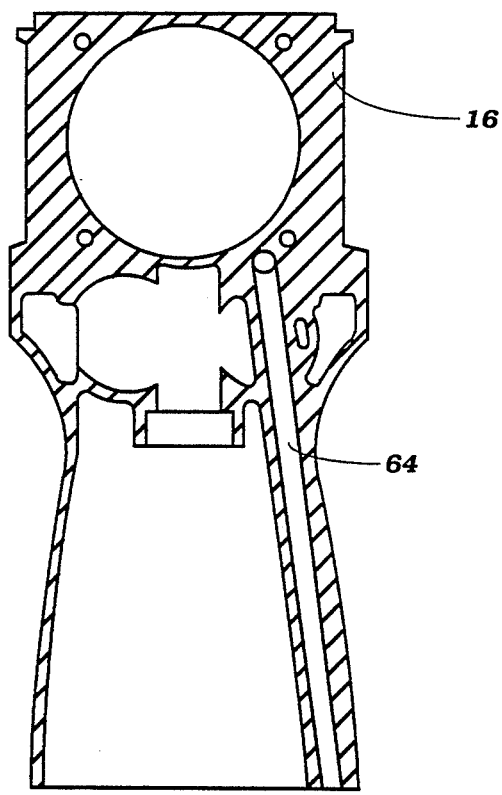
FIG. 3 is a cross-sectional view taken along the line 3—3 of FIG. 1.
Figure 4:
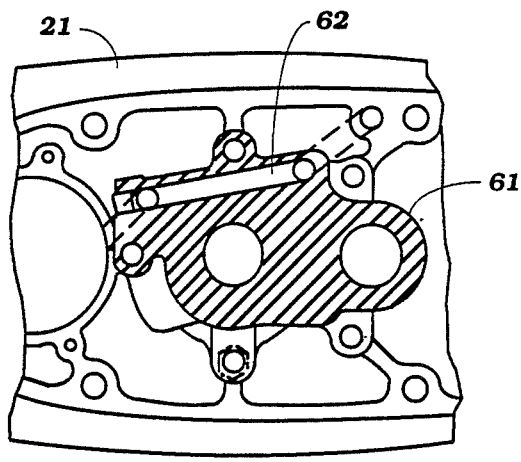
FIG. 4 is a cross-sectional view taken along the line 4—4 of FIG. 1.
Figure 5:
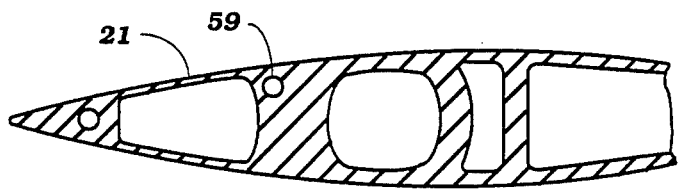
FIG. 5 is a cross-sectional view taken along the line 5—5 of FIG. 1.

It should be noted that the forward, reverse transmission 25 is contained within a cavity of the lower unit housing 21 which, in effect, defines a lubricant reservoir or lubricant sump. In accordance with the invention, a lubricant pump, indicated generally by the reference numeral 53 and shown in most detail in FIG. 2, is incorporated for drawing lubricant from this sump and delivering it to the transmission for driving the drive shaft 19 from the input shaft 14. This transmission comprises the bevel gear 38 and the interengaging bevel gear 33.

Referring specifically to FIG. 2, the lubricant pump 53 is of the trochoidal or gerotor type and includes a pump housing 54 that is formed integrally with the bearing carrier 45 and which has an inlet passage, to be described, that communicates with an inlet port 55. Lubricant is drawn through this inlet port into a pump cavity in which a rotor 56 is supported in a known manner. The rotor 56 is affixed to a drive shaft 57 which, in turn, has a splined connection to the rear end of the input shaft 14. Fluid pressurized by the rotation of the rotor 56 exits through an outlet port 58 of the lubricant pump 53.

Referring now again to the remaining figures, the lubricant conduitry comprises a first delivery passage 59 that extends from the lubricant sump up through the lower unit housing 21 and which intersects a bearing cap 61 which holds the bearing assembly comprised of the bearings 22 and 23 in place. This bearing cap 61 has a further lubricant passage 62 that communicates with a passage 63 formed in the lower unit 21 and a mating passageway 64 formed in the outer housing 16 of the outboard drive unit. This passageway communicates, at its upper end, with a passageway 65 formed in the bearing carrier 45 for delivering lubricant to the inlet port 55 of the pump 53.

The pump discharge port 58 communicates with a small passageway that delivers lubricant to the upper portion of the outboard drive unit 11 so as to lubricate the gears 33 and 38 and the bearings 35. This lubricant then returns down through a gap formed in the outer housing 16 around the upper end of the drive shaft 19 for return to the area surrounding the bearings 22 and 23 and eventual return to the lubricant sump through a return passageway 66. As a result, it should be readily apparent that all of the components of the system will be very effectively lubricated and the lubricant will be circulated so as to achieve its cooling.

It is to be understood that the foregoing description is that of a preferred embodiment of the invention and that various changes and modifications may be made without departing from the spirit and scope of the invention, as defined by the appended claims.

I claim:

1. A marine outboard drive comprised of an outer casing adapted to be mounted on the transom of a watercraft comprising an input shaft journaled within said outer casing for rotation about a generally horizontally extending axis, a drive shaft journaled for rotation about a generally vertically extending axis in said outer casing, first transmission means for driving said drive shaft from said input shaft, propulsion means carried by said outer casing at the lower end thereof, and second transmission means for driving said propulsion means from the lower end of said drive shaft, the improvement comprising a lubricant sump formed in said outer casing and surrounding in part said second transmission means, a lubricant pump positioned at the upper end of said outer casing and driven with said input shaft, and lubricant passage means communicating said lubricant sump with the input side of said lubricant pump and the output side of said lubricant pump with said lubricant sump for circulating lubricant through said outer casing.

2. A marine outboard drive as set forth in claim 1 wherein the lubricant pump is directly driven by the input shaft.

3. A marine outboard drive as set forth in claim 1 wherein the first transmission includes means for selectively rotating the drive shaft in either direction from the input shaft.

4. A marine outboard drive as set forth in claim 3 wherein the lubridant pump is directly driven by the input shaft.

5. A marine outboard drive as set forth in claim 3 wherein the means for reversing the direction of rotation of the drive shaft comprises gearing means for selectively reversing the direction of rotation of the drive shaft.

6. A marine outboard drive as set forth in claim 5 wherein the gearing means comprises a first bevel gear affixed to the upper end of the drive shaft and a second bevel gear selectively positionable on the input shaft on either side of the first bevel gear for effecting counterrotation of the drive shaft.

7. A marine outboard drive as set forth in claim 6 wherein the lubricant pump is directly driven by the input shaft.

8. A marine outboard drive as set forth in claim 1 further including an intermediate bearing supporting the drive shaft intermediate its ends and wherein the lubricant passage communicates with said intermediate bearing.

9. A marine outboard drive as set forth in claim 1 further including means for lubricating the first transmission means from the lubricant pump.

10. A marine outboard drive as set forth in claim 9 wherein the first transmission includes means for selectively rotating the drive shaft in either direction from the input shaft.

11. A marine outboard drive as set forth in claim 10 wherein the lubridant pump is directly driven by the input shaft.

12. A marine outboard drive as set forth in claim 10 wherein the means for reversing the direction of rotation of the drive shaft comprises gearing means for selectively reversing the direction of rotation of the drive shaft.

13. A marine outboard drive as set forth in claim 12 wherein the gearing means comprises a first bevel gear affixed to the upper end of the drive shaft and a second bevel gear selectively positionable on the input shaft on either side of the first bevel gear for effecting counterrotation of the drive shaft.

14. A marine outboard drive as set forth in claim 13 wherein the lubricant pump is directly driven by the input shaft.

15. A marine outboard drive as set forth in claim 14 further including an intermediate bearing supporting the drive shaft intermediate its ends and wherein the lubricant passage communicates with said intermediate bearing.

* * * * *